United States Patent
Dwyer et al.

(10) Patent No.: US 8,365,596 B2
(45) Date of Patent: Feb. 5, 2013

(54) METHOD FOR SENSING ACCELERATION USING A TRANSLATIONAL MASS IN-PLANE MEMS ACCELEROMETER

(75) Inventors: Paul W. Dwyer, Seattle, WA (US); John Strehlow, Mukilteo, WA (US)

(73) Assignee: Honeywell International Inc., Morristown, NJ (US)

( * ) Notice: Subject to any disclaimer, the term of this patent is extended or adjusted under 35 U.S.C. 154(b) by 311 days.

(21) Appl. No.: 12/816,062

(22) Filed: Jun. 15, 2010

(65) Prior Publication Data

US 2011/0005318 A1 Jan. 13, 2011

Related U.S. Application Data

(63) Continuation of application No. 12/500,487, filed on Jul. 9, 2009.

(51) Int. Cl.
 *G01P 15/125* (2006.01)
(52) U.S. Cl. ............... 73/514.32; 73/514.39; 73/514.17; 73/514.23
(58) Field of Classification Search ............... 73/514.01, 73/514.17, 514.23, 514.29, 514.31, 514.32, 73/514.39
 See application file for complete search history.

(56) References Cited

U.S. PATENT DOCUMENTS

| | | | |
|---|---|---|---|
| 3,702,073 A * | 11/1972 | Jacobs ........................ | 73/514.32 |
| 4,037,704 A * | 7/1977 | Golobay et al. .......... | 400/124.17 |
| 4,498,342 A * | 2/1985 | Aske ........................... | 73/514.23 |
| 4,515,013 A * | 5/1985 | Hue ............................ | 73/170.01 |
| 4,665,748 A * | 5/1987 | Peters ........................ | 73/504.12 |
| 4,750,364 A * | 6/1988 | Kawamura et al. ............. | 73/510 |
| 4,799,385 A * | 1/1989 | Hulsing et al. ............. | 73/504.12 |
| 4,912,990 A | 4/1990 | Norling | |
| 4,941,354 A * | 7/1990 | Russell et al. ............. | 73/514.24 |
| 5,005,413 A * | 4/1991 | Novack et al. ............. | 73/514.29 |
| 5,241,861 A * | 9/1993 | Hulsing, II ................ | 73/514.02 |
| 5,319,976 A * | 6/1994 | Hulsing, II ................ | 73/504.12 |
| 5,331,853 A * | 7/1994 | Hulsing, II ................ | 73/514.29 |
| 5,341,682 A * | 8/1994 | Hulsing, II ................ | 73/504.04 |
| 5,456,110 A * | 10/1995 | Hulsing, II ................ | 73/514.36 |
| 5,627,314 A | 5/1997 | Hulsing, II | |
| 5,948,982 A | 9/1999 | Woodruff et al. | |
| 6,276,203 B1 * | 8/2001 | Hulsing, II ................ | 73/504.03 |
| 6,295,870 B1 * | 10/2001 | Hulsing, II ................ | 73/514.37 |
| 6,463,802 B2 * | 10/2002 | Hulsing, II ................ | 73/504.04 |
| 6,467,348 B1 * | 10/2002 | Song et al. ................ | 73/504.12 |
| 6,636,819 B1 * | 10/2003 | Abbott et al. .................. | 702/96 |
| 6,843,126 B2 * | 1/2005 | Hulsing, II ................ | 73/504.04 |
| 7,331,229 B2 * | 2/2008 | Campbell et al. .......... | 73/514.32 |
| 8,065,915 B2 * | 11/2011 | Dwyer ....................... | 73/514.31 |

(Continued)

FOREIGN PATENT DOCUMENTS

EP 1359391 A2 11/2003
WO 0036374 A1 6/2000

*Primary Examiner* — Peter Macchiarolo
*Assistant Examiner* — Samir M Shah
(74) *Attorney, Agent, or Firm* — Lowe Graham Jones PLLC (57) ABSTRACT

An in-plane, closed-loop Micro Electro-Mechanical Systems (MEMS) accelerometer device with improved performance. An example MEMS device includes one or more components for generating a magnetic flux field perpendicular to a major plane of the device. The device includes substrates, a proof mass, spring elements that flexibly connect the proof mass to the substrate and constrain the proof mass to translate within the major plane of the device which corresponds to a major surface of the proof mass, a plurality of conductive traces located at a position on the proof mass proximate the magnetic flux field, a plurality of conductive springs, each of the springs are electrically connected to a corresponding one of the conductive traces, and a plurality of anchor pads connected to the substrate and one of the conductive springs.

12 Claims, 11 Drawing Sheets

U.S. PATENT DOCUMENTS

| | | | |
|---|---|---|---|
| 2001/0042405 A1* | 11/2001 | Hulsing, II | 73/514.02 |
| 2003/0005767 A1* | 1/2003 | Hulsing, II | 73/514.02 |
| 2008/0270060 A1* | 10/2008 | Dunne | 702/104 |
| 2010/0020636 A1* | 1/2010 | Kamata et al. | 367/13 |
| 2010/0083760 A1* | 4/2010 | Dwyer | 73/514.31 |
| 2010/0083761 A1* | 4/2010 | Dwyer et al. | 73/514.31 |
| 2010/0170341 A1* | 7/2010 | Dwyer et al. | 73/514.31 |
| 2010/0180681 A1* | 7/2010 | Dwyer | 73/514.17 |

* cited by examiner

METHOD FOR SENSING ACCELERATION USING A TRANSLATIONAL MASS IN-PLANE MEMS ACCELEROMETER

PRIORITY CLAIM

This application is a Continuation Application of U.S. application Ser. No. 12/500,487 filed Jul. 9, 2009 which is hereby incorporated by reference.

BACKGROUND OF THE INVENTION

Many accelerometers can be constructed on a single silicon-on-insulator (SOI) wafer leading to cost advantages over single-part-at-a-time construction methodologies. However, if a particular accelerometer includes electrical traces that form a coil applied to one side of a proof mass, then there is an issue of cost effectively constructing that device. Performance issues may arise because a coil trace that ends on the inside of a coil must loop over the coil in order to exit the proof mass. Also, devices formed in this manner may be susceptible to external magnetic fields, generate significant external flux leakage and may fail to meet flux requirements in order to servo the proof mass.

SUMMARY OF THE INVENTION

The present invention provides an in-plane Micro Electro-Mechanical Systems (MEMS) accelerometer device with improved performance. An example MEMS device includes one or more components for generating a magnetic flux field. The magnetic flux field being perpendicular to a major plane of the device. The device also includes a substrate, a proof mass, a spring element that flexibly connects the proof mass to the substrate for allowing motion of the proof mass in the major plane that corresponds to a major surface of the proof mass, a plurality of conductive coil traces located at a position on the proof mass proximate the magnetic flux field, a plurality of conductive springs, each of the springs being electrically connected to a corresponding one of the conductive coil traces, and a plurality of anchor pads connected to the substrate and one of the conductive springs.

The device also includes one or more sense combs having first tines located on the proof mass and opposing second tines attached to the substrate.

The device also includes damping combs having first tines located on the proof mass and opposing second tines attached to the substrate. The first damping comb tines are electrically isolated from the first sense comb tines.

In one aspect of the invention, each of the conductive springs includes two first legs having a first cross-sectional dimension, an elbow, and two second legs having a second cross-sectional dimension. The two second legs are connected between the elbow and one of the first legs and the second cross-sectional dimension is smaller than the first cross-sectional dimension.

In another aspect of the invention, isolation trenches directly connect to outer edges of the traces that are adjacent to other traces or proof mass material.

In still other aspects of the invention, the coil traces and sections of conductive springs include a plurality of slots.

BRIEF DESCRIPTION OF THE DRAWINGS

Preferred and alternative embodiments of the present invention are described in detail below with reference to the following drawings:

FIG. 1-1 illustrates a cross-sectional view of translational mass in-plane Micro Electro-Mechanical Systems (MEMS) accelerometer formed in accordance with an embodiment of the present invention;

FIG. 1-2 illustrates a perspective view of the MEMS accelerometer shown in FIG. 1-1;

FIG. 1-3 is a block diagram of a closed-loop accelerometer system using the MEMS accelerometer shown in FIGS. 1-1 and 1-2;

FIG. 2-1 illustrates a top view of a device layer in an example MEMS accelerometer formed in accordance with an embodiment of the present invention;

FIG. 2-2 is a blow-up view of a portion of the MEMS accelerometer shown in FIG. 2-1;

FIG. 5-1 illustrates a cross-sectional view of one of the conductive spring elements shown in FIG. 3;

FIG. 5-2 illustrates a cross-sectional view of coil traces located on a proof mass of the example MEMS accelerometer shown in FIG. 2-1;

FIGS. 7-1 through 7-9 are cross-sectional views illustrating an example process for creating the devices shown in FIGS. 1 and 2-1.

DETAILED DESCRIPTION OF THE INVENTION

Figure 11:
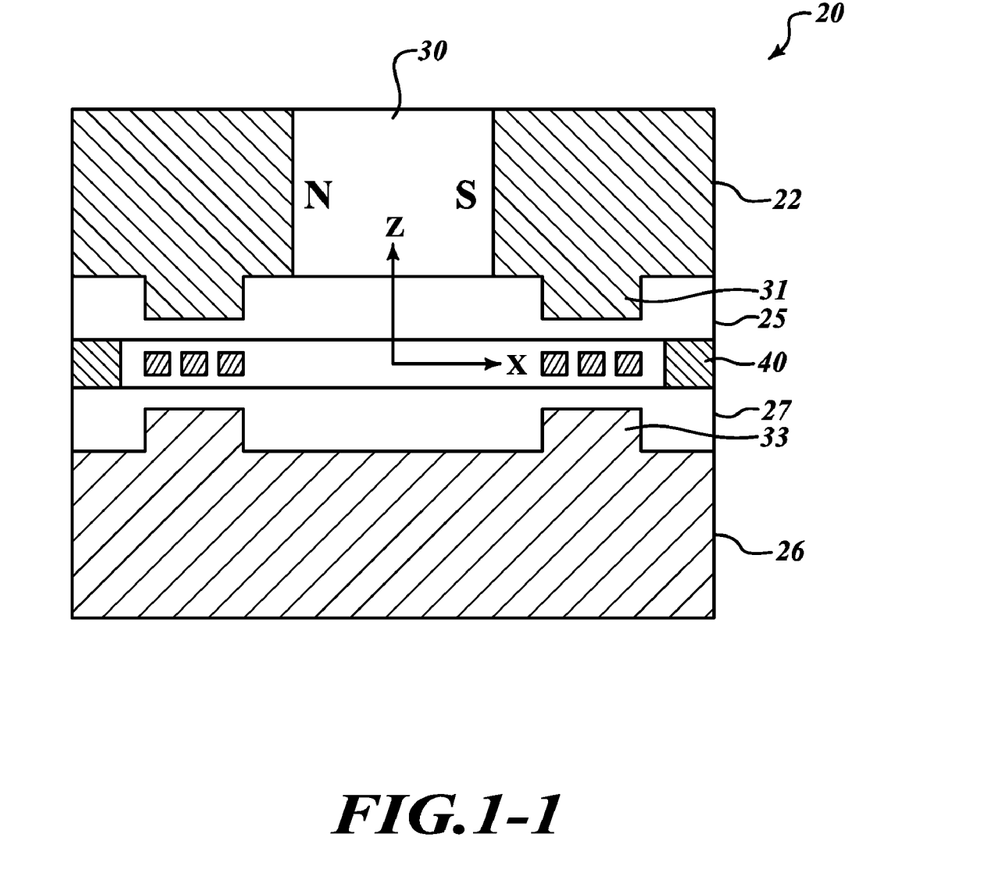
Figure 12:
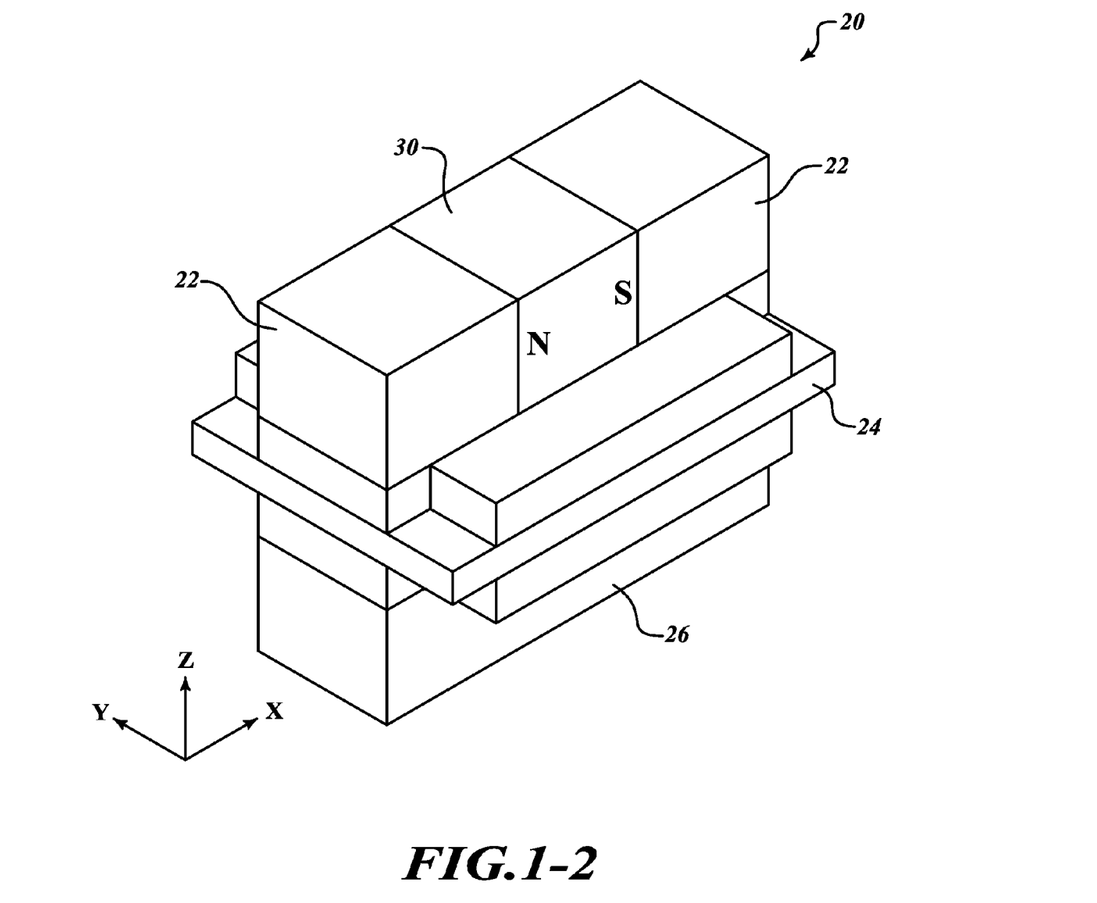

FIG. 1-1 illustrates an x-ray cross section view and FIG. 1-2 illustrates a perspective view of a translational mass in-plane Micro Electro-Mechanical Systems (MEMS) accelerometer 20 formed in accordance with an embodiment of the present invention. The accelerometer 20 includes a device layer 40 that is attached on each side to a substrate 25, 27. Magnet pole-piece layer 22 and a magnetic return path layer 26 are attached to the substrates 25, 27. A magnet 30 is sandwiched between each magnet pole-piece layer 22. Each magnet pole-piece layer 22 includes a protrusion 31 that extends into the substrate 25 at a location that corresponds with coil traces located on a proof mass, which is an integral part of the device layer 40. Each end of the magnetic return path layer 26 includes a protrusion 33 that extends into the substrate 27 at the location that corresponds with coils located on the proof mass.

As will be described in more detail below, the device layer 40 includes a proof mass that reacts to motion of the accelerometer 20 along the X axis. In closed loop operation, an electrical current is applied to the coil traces located on the proof mass creating a Lorentz force on the proof mass as the current passes through the magnetic field flux running between the magnet pole-piece layer 22 and the magnetic return path layer 26 at specific sections of the coil traces. The electrical current applied to the coil traces on the proof mass is adjusted so that the Lorentz force on the proof mass opposes and balances the acceleration inertial force on the proof mass there by forcing the proof mass to a null position consistent with a zero acceleration state. The amount of electrical current being applied is based on the position of the proof mass, which is based on a capacitance sensed by capacitive components formed between the movable proof mass and the fixed substrate 25 and 27.

Figure 13:
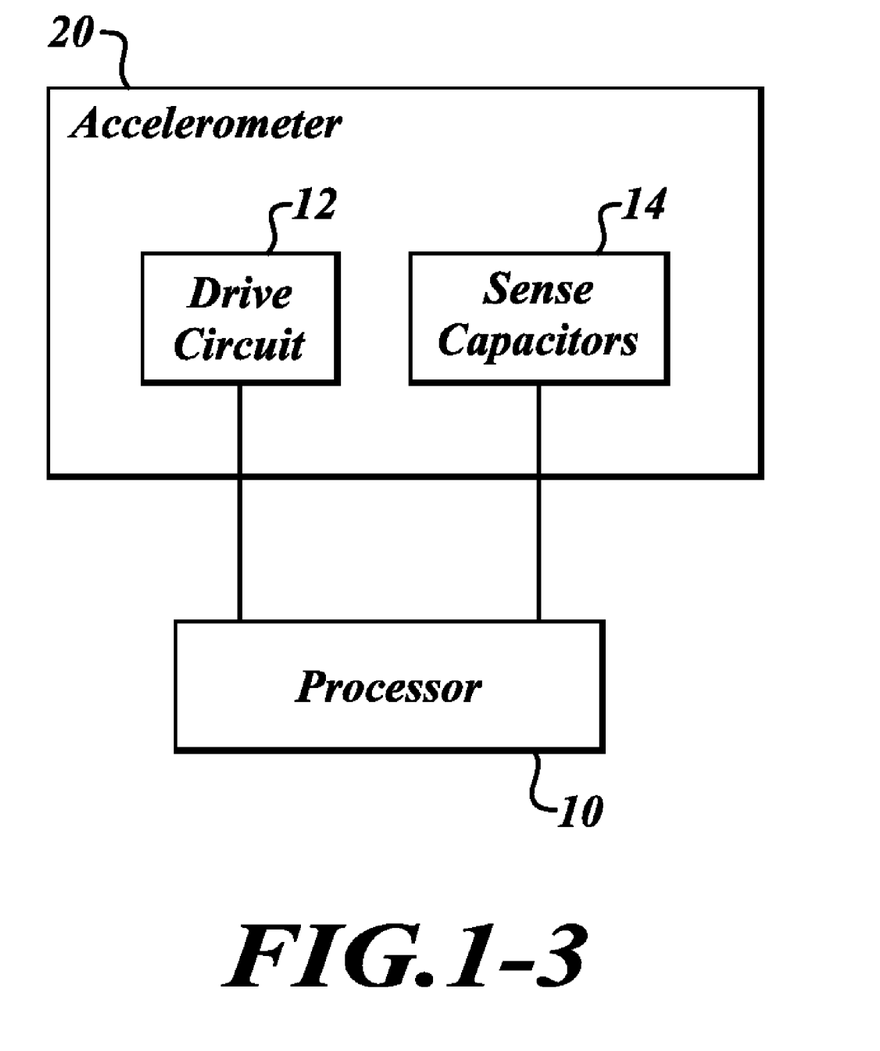

FIG. 1-3 is a block diagram illustrating a closed-loop system using the MEMS accelerometer 20 shown in FIGS. 1-1 and 1-2. The MEMS accelerometer 20 includes sense capacitors that generate a signal indicative of the location of the proof mass relative to a base substrate. The sense capacitors will be described in more detail below. This position signal is sent to a processor 10 that converts the position signal into a drive signal (electrical current) and a corresponding acceleration value, which is outputted via an output device (not shown). The drive signal is applied to a drive circuit 12 at the MEMS accelerometer 20. The drive circuit 12 includes the coil traces located on the proof mass. A change in current applied to the coil traces causes a force to be applied to the proof mass as the current passes through the magnetic flux produced by the magnet pole-piece layer 22 and the magnetic return path layer 26. This force should be equal and opposite to the sensed acceleration inertial force.

Figure 21:
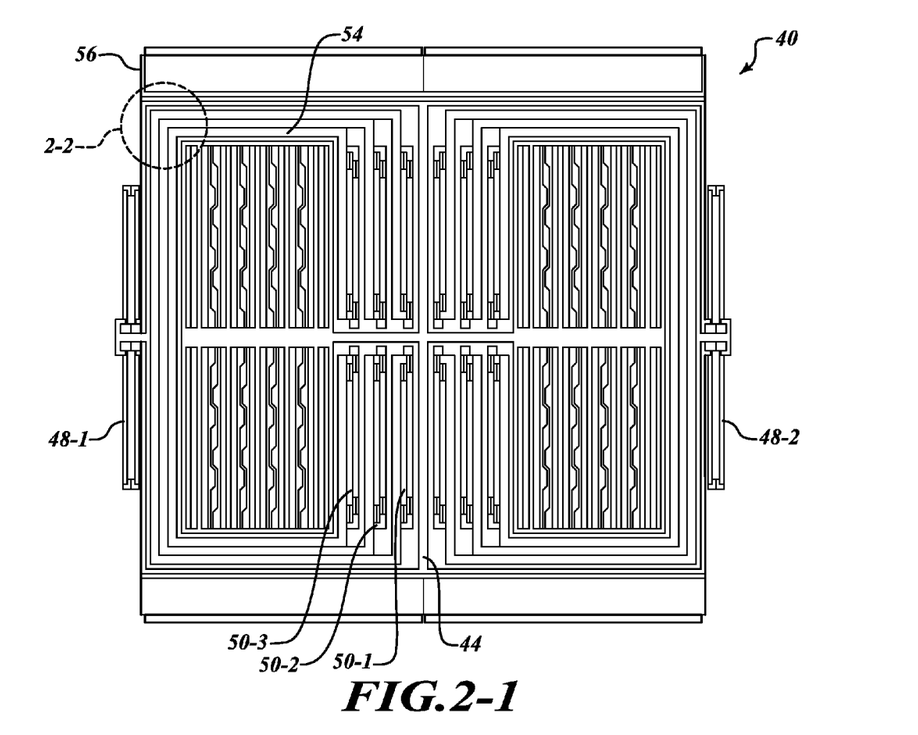
Figure 22:
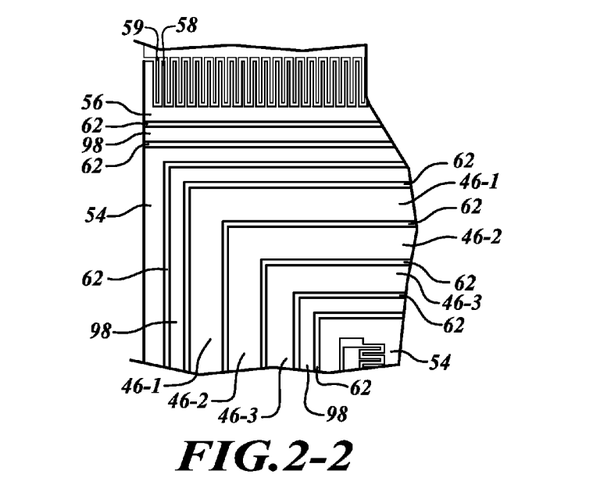

FIG. 2-1 illustrates a top view of a device layer 40 for an example translational mass in-plane MEMS accelerometer. The device layer 40 includes a proof mass 44 that is connected to a substrate (not shown) by outer support springs 48-1 and 48-2. The springs 48-1 and 48-2 allow the proof mass 44 to move in the plane of the device layer 40 while constrained to move only in a single translation direction. Fabricated as an integral part of the proof mass 44 are a plurality of conductive coil traces 46-1, 46-2 and 46-3 shown on FIG. 2-2. The coil traces 46-1, 46-2 and 46-3 are electrically connected to respective inner support conductive springs 50-1, 50-2 and 50-3 shown on FIG. 2-1. Mounted on outer edges of the proof mass 44 is a damping comb trace 56 that includes a plurality of attached tines 58, shown in FIG. 2-2, and opposing tines 59 attached to the substrate, shown in FIG. 2-2. The damping comb tines 58 and 59 may be used for electrostatic spring softening to reduce the natural frequency of the device.

The damping comb tines attached to the proof mass 44 are electrically isolated from the pick-off comb tines located on the proof mass 44. The damping comb tines attached to the proof mass 44 are electrically connected to a flexure on one of the outer spring elements 48 and the pick-off comb tines 68 attached to the proof mass 44 are electrically connected to another flexure on the outer support spring 48.

Figure 3:
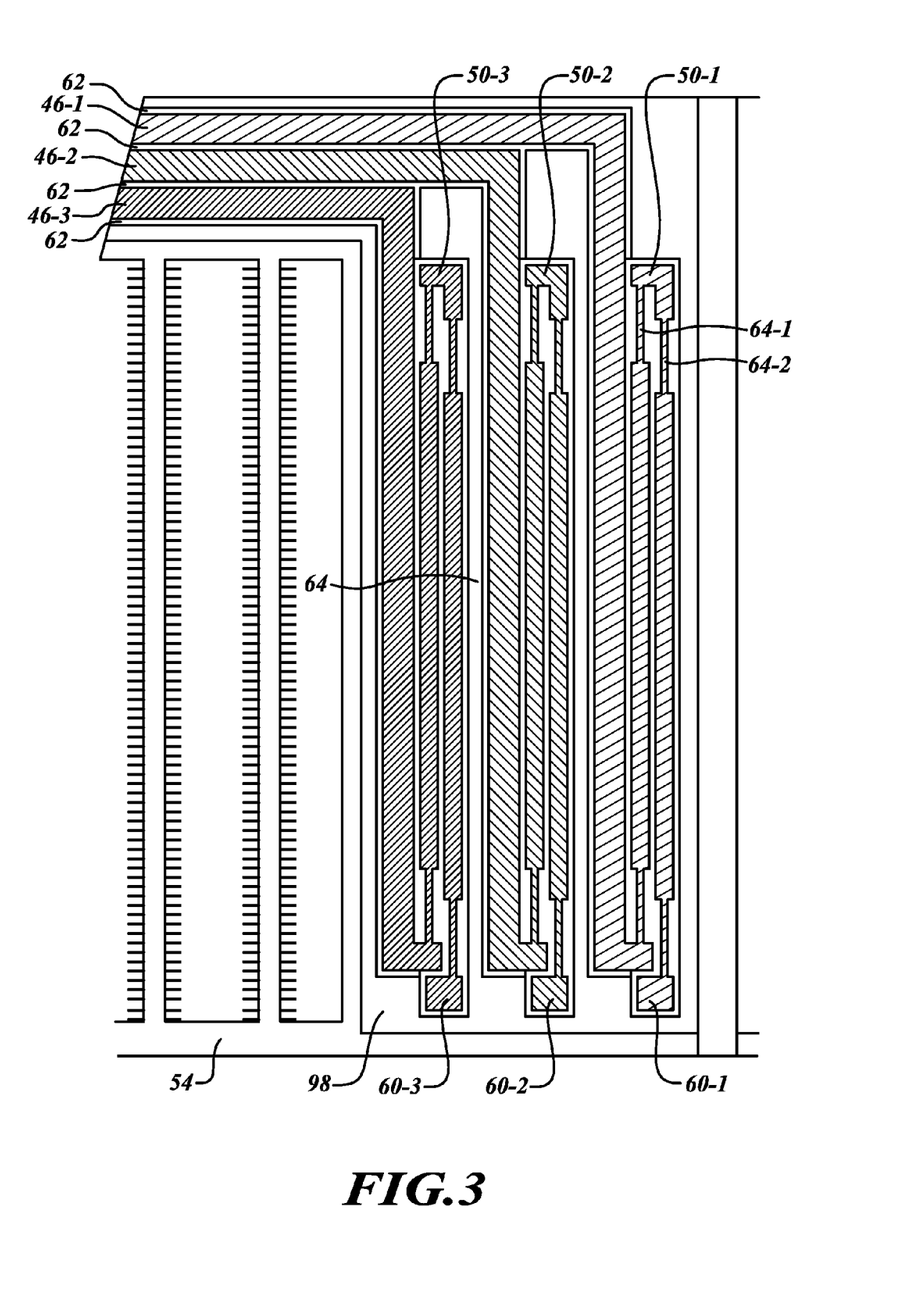
FIG. 3 illustrates a blow-up view of conductive springs and coil traces of the example MEMS accelerometer shown in FIG. 2-1.

As shown in FIG. 3, each of the inner support conductive springs 50-1, 50-2 and 50-3 are physically and electrically attached to the respective coil trace 46-1, 46-2 and 46-3 and a respective anchor pad 60-1, 60-2 and 60-3. The inner support conductive springs 50-1, 50-2 and 50-3 include narrow cross-sectional bending members interspersed with wider cross-sectional links, respective anchor pads 60-1, 60-2 and 60-3, a corner element and ends of the coil traces 46-1, 46-2 and 46-3. The narrow cross-sectional bending members minimize the stiffness of the conductive springs 50-1, 50-2 and 50-3. Only the anchor pads 60-1, 60-2 and 60-3 are attached to the substrate.

The space 64-1 between the lengths of a particular one of the conductive springs and the space 64-2 around an exterior edge of the particular conductive springs are open all the way through the thickness of proof mass 44. An insulator barrier in-fill 62 is located between each of the coil traces 46-1, 46-2 and 46-3 and the adjacent ground trace 98.

Figure 4:
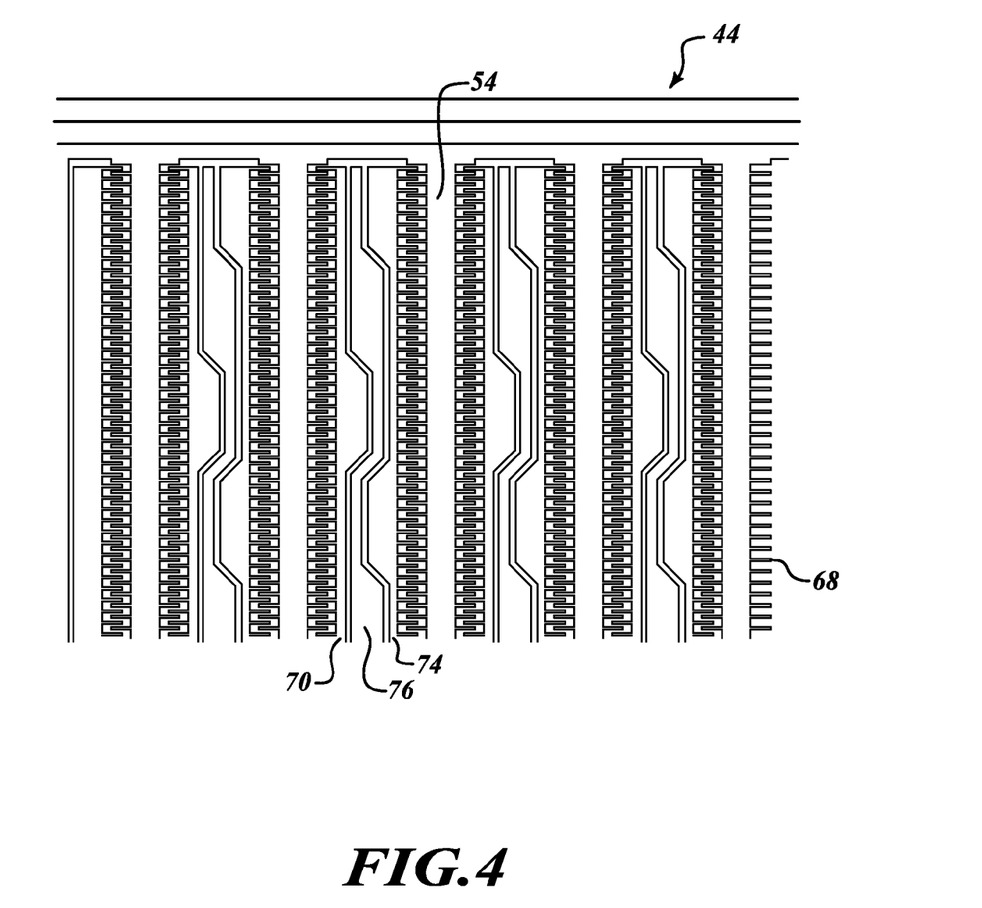
FIG. 4 illustrates a partial view of capacitive pick-off or position sense components for the MEMS accelerometer shown in FIG. 2-1.

FIG. 4 illustrates a partial top view of a portion of the pick-off comb region of the accelerometer shown in FIG. 2-1. Mounted on the inner region of the proof mass 44 is the pick-off comb trace 54 that includes a plurality of attached tines 68. Opposing tines 70 and 74 are attached to the substrate and are interleaved with the pick-off tines 68. In an optional configuration, a ground plane 76 is attached to the substrate between opposing stationary tines 70 and 74. The ground plane 76 is intended to reduce parasitic capacitances. Interleaved tines 70 and 68 form one group of position sense capacitors and interleaved tines 74 and 68 form a second group of position sense capacitors. These two capacitor groups provide opposite changes in capacitance value, either increasing or decreasing, for a particular change in proof mass position. The position signal is then derived by taking the difference between the two capacitance groups.

Figure 51:
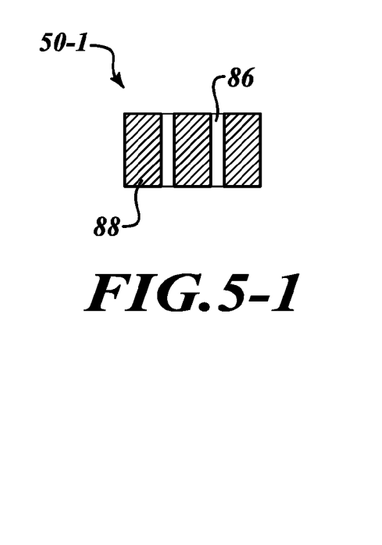
Figure 52:
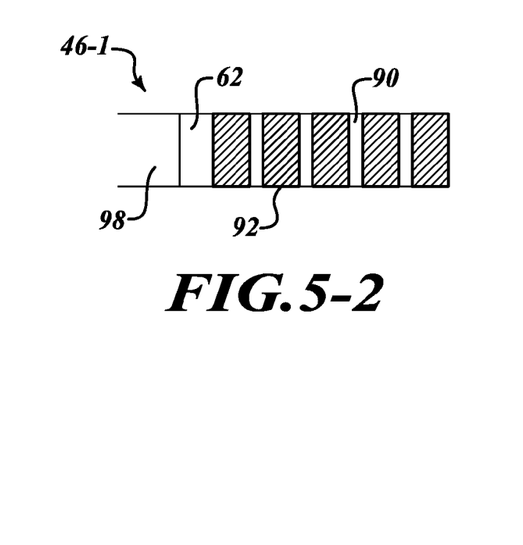
Figure 71:
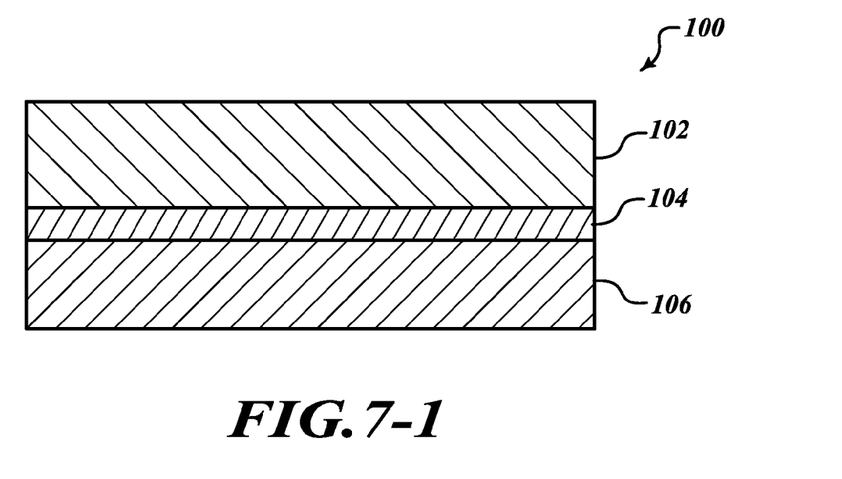
Figure 72:
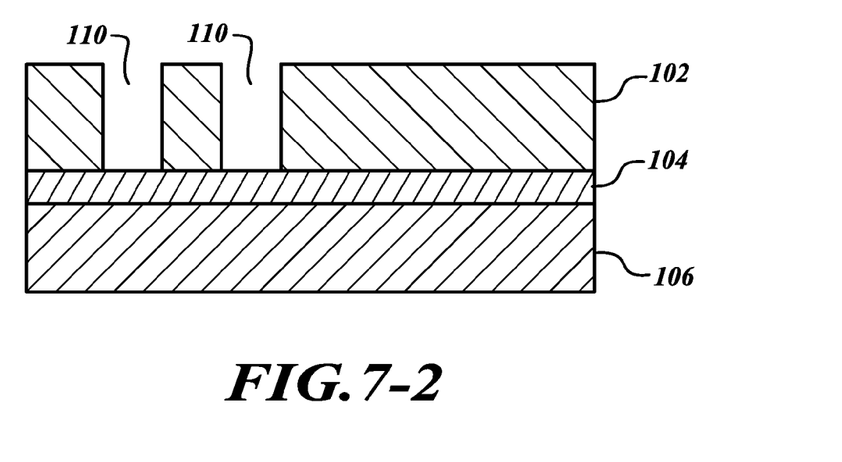

FIG. 5-1 illustrates a cross-sectional view of one of the wider cross-sectional links of the conductive spring 50-1. The conductive spring 50-1 includes solid areas of highly doped silicon 88. The areas include a plurality of etched slots 86. The slots 86 are used to help increase the electrical conductivity by allowing more doping of the link cross section of conductive spring 50-1. This configuration is repeated in the other conductive springs 50-2 and 50-3.

Figure 6:
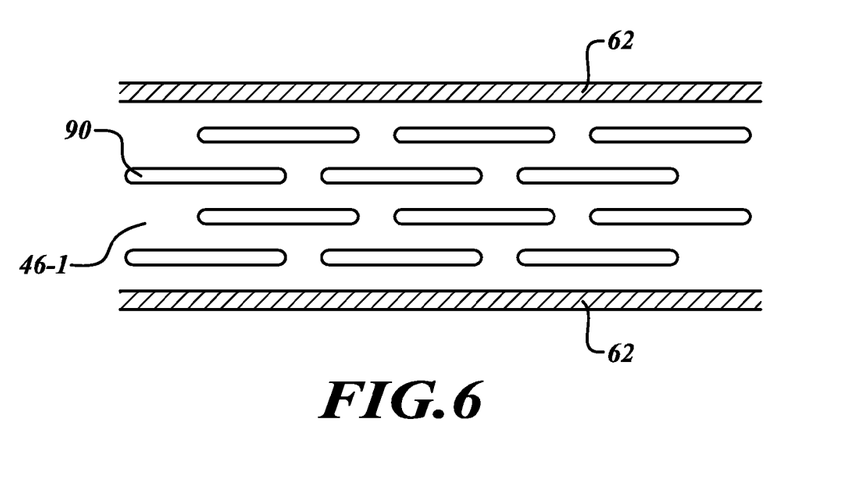
FIG. 6 illustrates a partial top view of example coil traces used in the devices shown in FIGS. 1 and 2-1.

FIG. 5-2 illustrates a cross-sectional view of the coil trace 46-1. The coil trace 46-1 includes an area of highly doped silicon 92. The area of silicon 92 includes a plurality of etched slots 90. The slots 90 also help increase electrical conductivity by allowing more doping of the electrical trace cross section. Adjacent to the coil trace 46-1 is In-fill 62. The In-fill 62 is located between coil traces 46-1, 46-2 and 46-3 and is also located between coil traces 46-1, 46-2 and 46-3 and the adjacent ground trace 98 to provide electrical isolation from the pick-off trace 54 (shown in FIGS. 2-2 and 3). The ground trace also provides electrical isolation between the pick-off comb trace 54 and the damping comb trace 56 (shown in FIG. 2-2). In-fill is a dielectric material grown between the various conductive traces and provides electrical isolation while maintaining proof mass stiffness. One implementation of the In-fill includes a combination of oxide and nitride such that the compressive and tensile stresses created net out to zero to minimize warpage. FIG. 6 shows a top view of the slots 90.

FIGS. 7-1 through 7-9 are cross-sectional views of steps in an example process for forming a device such as is shown in FIG. 2-1. First, at FIG. 7-1, a silicon-on-insulator (SOI) wafer 100 having a silicon device layer 102 and a handle (e.g. silicon) layer 106 separated by an insulator layer 104, such as silicon oxide. Next, as shown in FIG. 7-2 isolation trenches and slots 110 are etched into the device layer 102. Deep reactive ion etching (DRIE) is used to create the trenches and slots 110. The trenches are comparable to the isolation barrier 62 shown in FIG. 3. Slots are comparable to the slots 90 shown in FIGS. 5-2 and 6.

Figure 73:
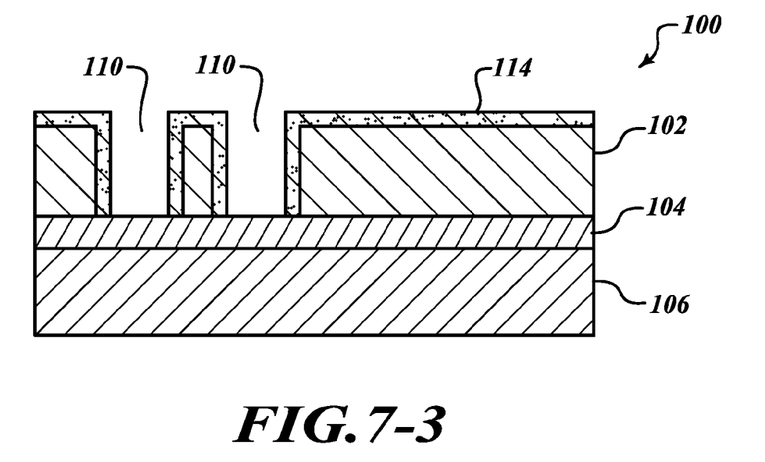

Next, at FIG. 7-3, the exposed surfaces of the device layer 102 are doped in order to increase the electrical conductivity of exposed surfaces 114 of the device layer 102. An example dopant is boron.

Figure 74:
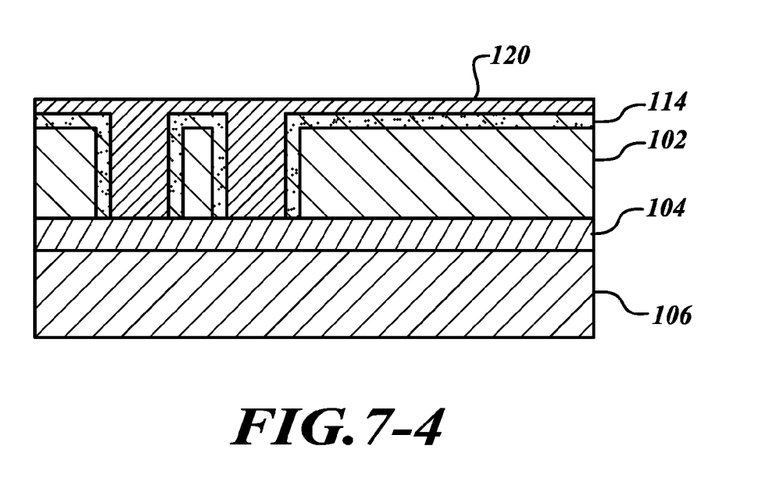

Next, at FIG. 7-4, In-fill is applied to the wafer 100. In one example, the In-fill is oxide\nitride. The In-fill occupies the trenches and slots 110 and produces a layer on the top horizontal surface of the device layer 102.

Figure 75:
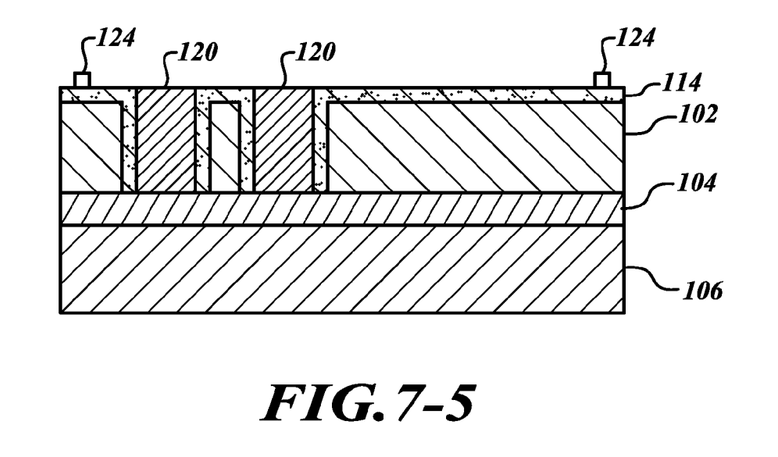

Next, as shown in FIG. 7-5, the wafer 100 is planarized to remove the In-fill that is located on the exterior horizontal surface of the device layer 102, thereby leaving In-fill 120 in the previously open trenches and slots 110. Next, contact bumps 124 are applied to the now exposed surface of the device layer 102. Application of the bumps 124 is performed using a masking and metallization process.

Figure 76:
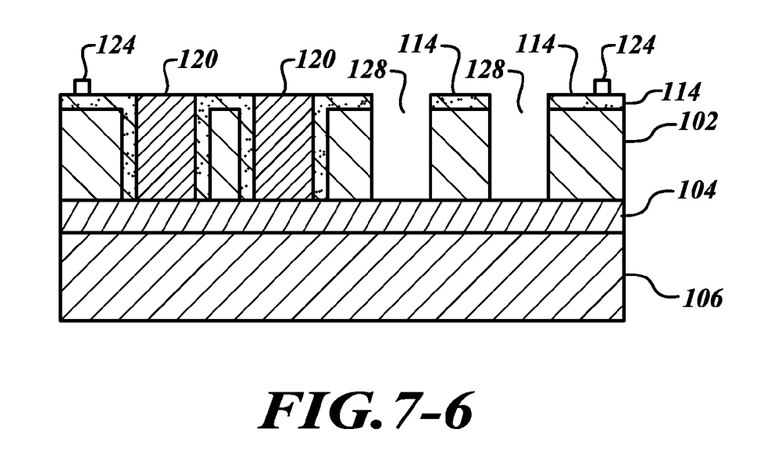
Figure 77:
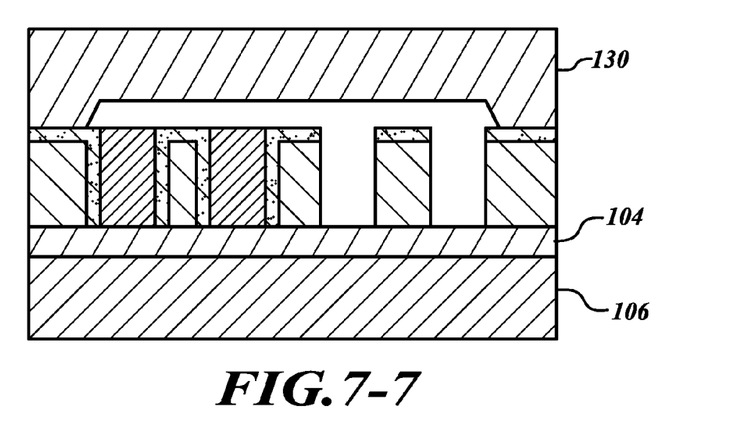
Figure 78:
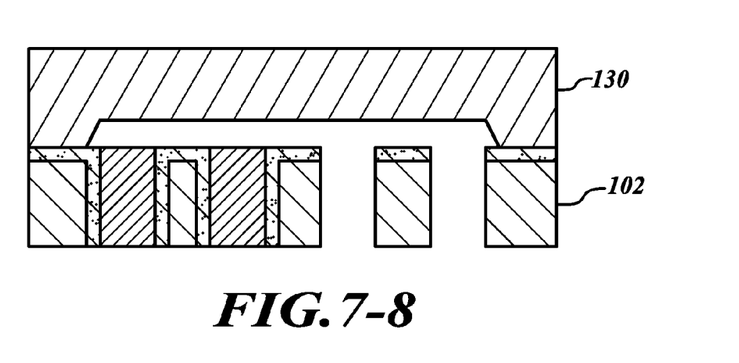
Figure 79:
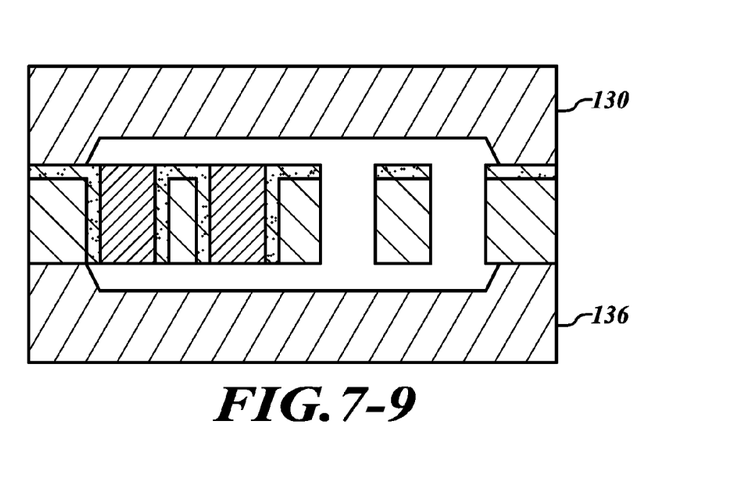

Next at FIG. 7-6, a second DRIE process is performed in order to etch slots 128 for defining the proof mass, springs, damping combs and pick-off combs.

As shown in FIG. 7-7, a magnetic component 130, comparable to the magnetic cover 22 shown in FIG. 1, is anodically bonded to the device layer 102 via the borosilicate glass component of the return path. This simultaneously serves to complete electrical connections via metallization bumps 124. At FIG. 7-8 both the handle layer 106 and the oxide layer 104 are removed. Then, at FIG. 7-9, a magnetic return path 136, similar to the magnet return path 26 shown in FIG. 1 is anodically bonded to an opposing surface of the device layer 102. After this step, the wafer is ready for dicing for separation into individual components ready for mounting onto a circuit board or some other device. The present embodiment of the attach process has a top silicon element anodically bonded to the exposed oxide layer of the device around the periphery. The top silicon layer has recesses built into it using DRIE to accommodate extremities of the upper return path parts which allow the driving flux to intensify by minimizing the magnetic circuit air gap. The silicon/glass assembly is diced prior to the bonding of the magnetic circuit components. The bottom return path component is then aligned to the device and epoxy bonded. The magnet is aligned and bonded to the upper return path parts which are attached to either end of the magnet. This assembly is then aligned and epoxy bonded to the lower return path/device assembly.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method for sensing acceleration using an in-plane Micro Electro-Mechanical Systems (MEMS) accelerometer device, the method comprising:
    fabricating a proof mass with flex elements that constrain movement of the proof mass to a transverse direction in-plane, parallel to a major plane of the device;
    forming at least one isolated conductive coil trace within a material of the proof mass;
    generating a magnetic flux field, the magnetic flux field being perpendicular to the major plane wherein the generated magnetic flux field intersects at least one section of the at least one conductive coil trace located within the proof mass;
    generating a signal representative of an in-plane position of the proof mass;
    generating a drive signal based on the generated position signal;
    applying a current to the at least one conductive coil trace based on the generated drive signal to develop a Lorentz force on the proof mass that opposes an inertial acceleration force on the proof mass; and
    outputting, based on the generated drive signal, a signal that represents the acceleration being sensed,
    wherein forming the at least one conductive coil trace comprises:
        applying a dopant to locations associated with the at least one conductive coil trace; and
        applying a dielectric insulator around the at least one conductive coil trace, thereby isolating the at least one conductive coil trace from other traces or adjacent regions of the proof mass.

2. The method of claim 1, wherein generating the magnetic flux field comprises generating two magnetic flux fields that intersect the at least one conductive coil trace at two different locations on the proof mass.

3. The method of claim 2, wherein the at least one conductive coil trace comprises at least two separate trace segments, one for each magnetic flux field intersecting the proof mass.

4. The method of claim 1, wherein the dopant is Boron.

5. The method of claim 1, wherein generating the magnetic flux field comprises attaching a magnet and magnetic permeable component adjacent to one side of the proof mass and a magnetic permeable return path adjacent to an opposite side of the proof mass.

6. The method of claim 5, wherein at least one of the magnet and magnetic permeable component and the magnetic permeable return path comprise one or more protrusions that extend to a predefined distance from the at least one coil trace.

7. The method of claim 1, wherein generating the magnetic flux field comprises attaching a first magnet and magnetic permeable component adjacent to one side of the proof mass and a second magnet and magnetic permeable component adjacent to an opposite side of the proof mass.

8. The method of claim 7, wherein at least one of the first magnet and magnetic permeable component and the second magnet and magnetic permeable component comprise protrusions that extend to a predefined distance from the at least one coil trace.

9. A method for sensing acceleration using an in-plane Micro Electro-Mechanical Systems (MEMS) accelerometer device, the method comprising:
    fabricating a proof mass with flex elements that constrain movement of the proof mass to a transverse direction in-plane, parallel to a major plane of the device;
    forming at least one isolated conductive coil trace within a material of the proof mass;
    generating a magnetic flux field, the magnetic flux field being perpendicular to the major plane wherein the generated magnetic flux field intersects at least one section of the at least one conductive coil trace located within the proof mass;
    generating a signal representative of an in-plane position of the proof mass;
    generating a drive signal based on the generated position signal;
    applying a current to the at least one conductive coil trace based on the generated drive signal to develop a Lorentz force on the proof mass that opposes an inertial acceleration force on the proof mass; and
    outputting, based on the generated drive signal, a signal that represents the acceleration being sensed,
    wherein generating the magnetic flux field comprises attaching a magnet and magnetic permeable component adjacent to one side of the proof mass and a magnetic permeable return path adjacent to an opposite side of the proof mass.

10. The method of claim 9, wherein at least one of the magnet and magnetic permeable component and the magnetic permeable return path comprise one or more protrusions that extend to a predefined distance from the at least one coil trace.

11. A method for sensing acceleration using an in-plane Micro Electro-Mechanical Systems (MEMS) accelerometer device, the method comprising:
    fabricating a proof mass with flex elements that constrain movement of the proof mass to a transverse direction in-plane, parallel to a major plane of the device;
    forming at least one isolated conductive coil trace within a material of the proof mass;
    generating a magnetic flux field, the magnetic flux field being perpendicular to the major plane wherein the generated magnetic flux field intersects at least one section of the at least one conductive coil trace located within the proof mass;

generating a signal representative of an in-plane position of the proof mass;

generating a drive signal based on the generated position signal;

applying a current to the at least one conductive coil trace based on the generated drive signal to develop a Lorentz force on the proof mass that opposes an inertial acceleration force on the proof mass; and outputting, based on the generated drive signal, a signal that represents the acceleration being sensed, wherein generating the magnetic flux field comprises attaching a first magnet and magnetic permeable component adjacent to one side of the proof mass and a second magnet and magnetic permeable component adjacent to an opposite side of the proof mass.

12. The method of claim 11, wherein at least one of the first magnet and magnetic permeable component and the second magnet and magnetic permeable component comprise protrusions that extend to a predefined distance from the at least one coil trace.

* * * * *